United States Patent [19]

Wilson

[11] 4,391,084
[45] Jul. 5, 1983

[54] TOBACCO DEFOLIATING UNITS WITH OVERLAPPING CUTTING EDGES

[75] Inventor: Robert W. Wilson, Charlotte, N.C.

[73] Assignee: Powell Manufacturing Company, Inc., Bennettsville, S.C.

[21] Appl. No.: 343,524

[22] Filed: Jan. 28, 1982

[51] Int. Cl.³ ............................................ A01D 45/16
[52] U.S. Cl. ...................................................... 56/27.5
[58] Field of Search ......................... 56/27.5, 330, 331; 130/30 R, 31 R

[56] References Cited

U.S. PATENT DOCUMENTS

| | | | |
|---|---|---|---|
| 2,816,411 | 12/1957 | Wilson | 56/27.5 |
| 3,083,517 | 4/1963 | Wilson | 56/27.5 |
| 3,093,949 | 6/1963 | Wilson | 56/27.5 |
| 3,772,862 | 11/1973 | Wilson | 56/27.5 |
| 4,178,745 | 12/1979 | Wilson | 56/27.5 |

*Primary Examiner*—Jay N. Eskovitz

[57] ABSTRACT

An apparatus for priming tobacco plants having stalks and leaves extending outwardly therefrom comprising a pair of intermeshing defoliating units each of which includes a plurality of elongated members having sharp upper cutting edges extending generally in directions both longitudinal and transverse with respect to the row of plants. The units are driven such that the elongated members are moved through an orbital translational cycle in a direction such that the cutting edges of each elongated member will be moved inwardly toward the stalks, upwardly to sever the leaves from the stalks and then outwardly to carry the severed leaves away from the stalks. The improvement of the invention consists essentially in arranging the units with respect to one another such that the longitudinal extent of the cutting edges associated with the elongated members of each unit during their movement inwardly toward the stalks pass into a common vertical plane disposed closely adjacent the associated side of the stalks of a row of tobacco plants. The distance between the aforesaid vertical planes associated with both units is less than the transverse extent of the cutting edges of the units so that the free ends of the transverse extent of the cutting edges of each elongated member associated with each unit during their movement inwardly toward the stalk moves inwardly a distance beyond the vertical plane associated with the other unit so as to insure that leaves attached to stalks at positions other than at opposite sides thereof with respect to the row will be severed.

4 Claims, 9 Drawing Figures

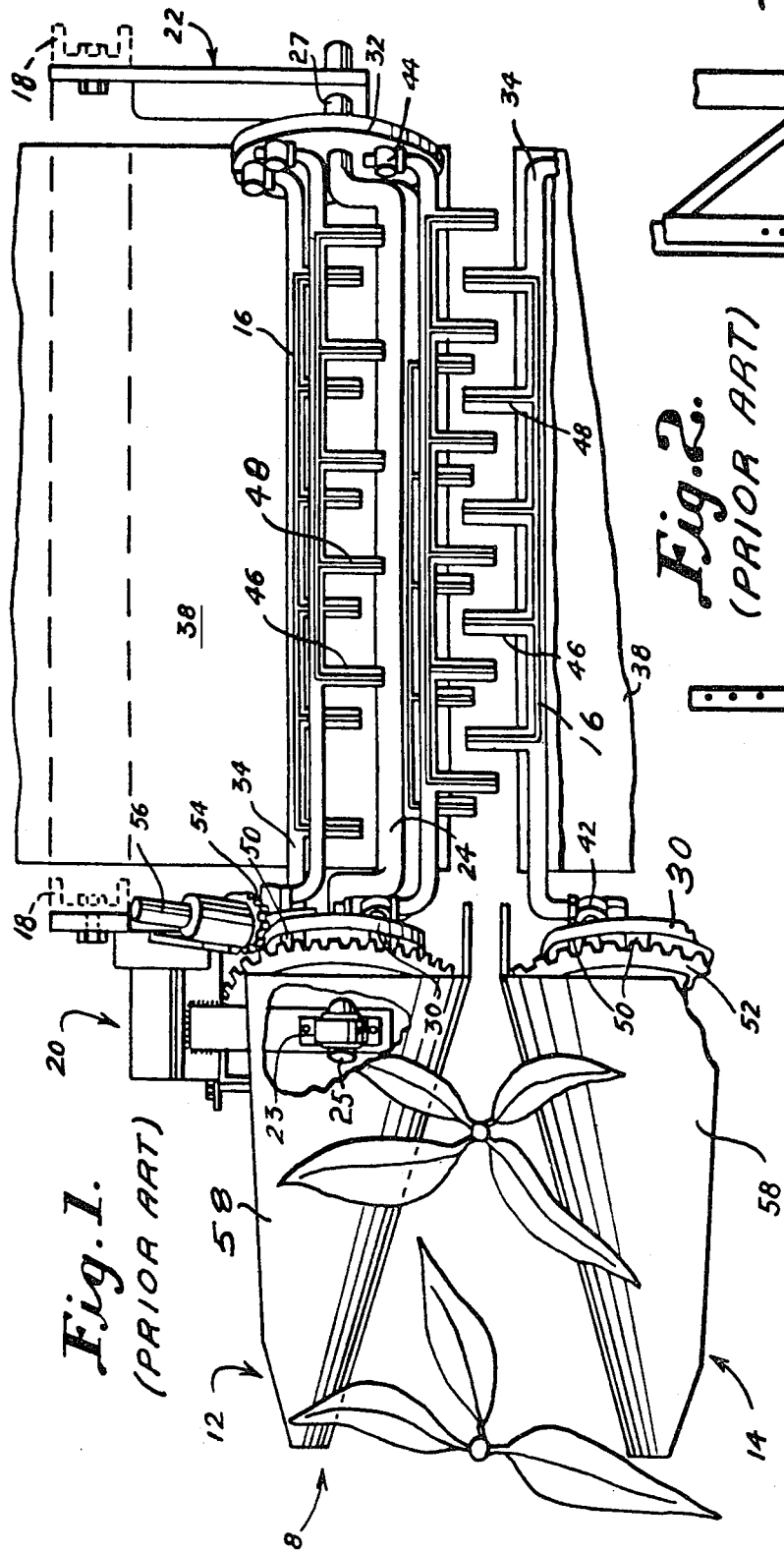
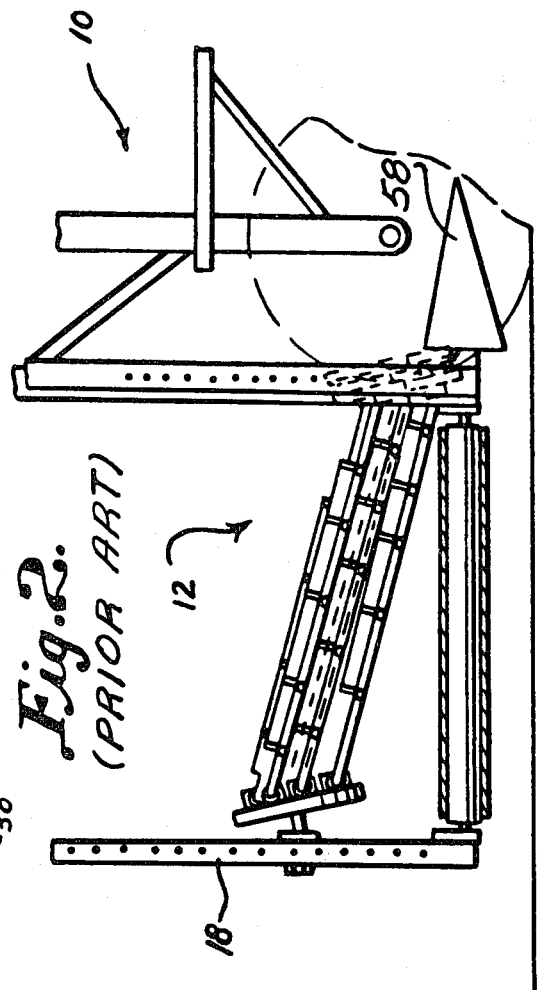

TOBACCO DEFOLIATING UNITS WITH OVERLAPPING CUTTING EDGES

This invention relates to tobacco leaf priming and more particularly to improvements in cutting blade type priming or defoliating assemblies such as disclosed in U.S. Pat. No. 3,093,949 dated June 18, 1963.

The priming assembly disclosed in the aforesaid patent has received a degree of acceptance in the commercial market. The cooperating defoliating units of the assembly are particularly useful in the last few primings during the season where the leaves are removed from the uppermost positions on the stalks. In actual operation, it has been found that the leaves are generally easy to cut off, while those that grow almost vertically adjacent to the stalk are quite difficult to cut off. Small leaves are also difficult to cut completely from the stalk. Another difficulty encountered is that small spindly stalks especially near the top of the plant cause a greater distance to develop between the cutting blade and the stalk accentuating the cutting problem involved. Many of these situations which are more commonly encountered at the upper positions of the stalk can cause the leaves to shred and the cutting action to be incomplete so as to leave portions of the leaf or stem on the stalks. These problems are due to a number of reasons such as variety, weather, soil, fertilizer, and the like.

Applicant has found that a significant improvement in cutting the problem leaves noted above can be obtained by changing the intermeshing relationship between the cutting members of each of the pair of cooperating defoliating units of the type disclosed in the patent. Each of the defoliating units as disclosed in the patent includes a forward rotary element mounted on the frame for rotation about a first axis, a rearward rotary element mounted on the frame in a position spaced rearwardly and upwardly with respect to the forward rotary element for rotation about a second axis parallel to the first axis. A plurality of elongated members extend between the rotary elements, the forward ends thereof being mounted on the forward rotary element for rotational movement about axes parallel to the first axis and spaced circumferentially thereabout and the rearward ends of the elongated members being mounted on the rearward rotary element for rotational movement about axes parallel with the second axis and spaced circumferentially therebout. Each of the elongated members includes cutting blades having sharp upper cutting edges extending generally in directions both longitudinal and transverse with respect to the row of plants. The units are driven together in a direction such that the cutting edges of each elongated member will be moved inwardly toward the stalks, upwardly to sever the leaves from the stalks and then outwardly to carry the severed leaves away from the stalks.

In the specific embodiment shown in the patent as well as the commercial embodiment thereof, the transverse extent of the cutting edges of each unit is in the direction toward the other unit and in longitudinally intermeshing relation with a cooperatively elongated member when disposed in cutting relation. More specifically, in both the embodiment shown in the patent as well as the commercial embodiments of the subject matter, the units are intermeshed in such a way that the cutting edges of each elongated member when disposed in its innermost cutting position adjacent the stalk, has its transverse cutting edges intermeshed with the transverse cutting edges of an elongated member of the other unit likewise disposed in its innermost cutting position. With this relationship wherein the free ends of the transverse cutting edges of each unit closely approach the longitudinal cutting edges of the other unit there is presented a limitation as to how far each of the transverse cutting edges can extend and/or how close each of the longitudinal cutting edges can be disposed with respect to each other. The situation can be best understood by considering just those portions of the cutting edges which are disposed in surrounding relation to a tobacco stalk as two of the elongated members move into their innermost position. In this position, one of the transverse cutting edges is disposed in a position forwardly of the stalk while the other transverse cutting edge is disposed in a position rearwardly of the stalk with the adjacent longitudinal edges on the opposite sides thereof. Because of the need to provide clearance the free ends of the transverse cutting edges must be spaced from the longitudinal cutting edge portion of the opposite unit. This provides two gaps in the cutting edge surrounding the stalk, which gaps are disposed at 45° angles with respect to the direction of extent of the tobacco row. This consequently requires that the elongated members are spaced a set distance apart to maintain the clearance gap and cannot be moved closer together. Applicant has found that it is this relationship which accounts for the tendency for the patented system to shred or leave portions of the leaf or stem on the stalk when cutting the uppermost leaves.

Accordingly, it is an object of the present invention to overcome the aforesaid problems. In accordance with the principles of the present invention, this problem is overcome by the recognition of the relationship noted above and by the expedient of moving the two cooperating units into a different position of cooperative operation wherein the longitudinal extent of the cutting edges associated with the elongated members of each unit during their movement inwardly toward the stalk pass into a common vertical plane disposed closely adjacent the associated side of the stalk of a row of tobacco plants along which the vehicle frame is moved so as to insure that leaves attached to stalks at positions adjacent opposite sides thereof with respect to the row will be severed. In addition, the distance between the aforesaid vertical planes associated with both units is made to be less than the transverse extent of the cutting edges of the units so that the free ends of the transverse extent of the cutting edges of each elongated member associated with each unit during their movement inwardly toward the stalk will move inwardly a distance beyond the vertical plane associated with the other unit so as to insure that the leaves attached to the stalks will be severed. Thus, when considering the arrangement of cutting edges when in cutting relation to a stalk, there is a complete peripheral cutting edge provided at a position closer to the stalk and without the gaps heretofore provided thus resulting in an improvement in the cutting action and one which achieves defoliation with less shedding of leaves and less leaving of portions of the leaf or stem on the stalk.

In accordance with the principles of the present invention, a preferred arrangement for achieving the relationship noted above is to simply move one of the units vertically upwardly and horizontally inwardly with respect to the other. This insures the aforesaid overlap and complete peripheral cutting pattern while at the same time achieving the required clearance.

Another object of the present invention is the provision of an improved defoliating mechanism of the type described which is simple in construction, effective in operation, and economical to manufacture and maintain.

These and other objects of the present invention will become more apparent during the course of the following detailed description and appended claims.

The invention can best be understood with reference to the accompanying drawings wherein an illustrative embodiment is shown.

In the drawings:

FIG. 1 is a top plan view of a defoliating mechanism of the type disclosed in the aforesaid U.S. Pat. No. 3,093,949;

FIG. 2 is a side elevational view, with parts broken away and shown in section, of the defoliating mechanism of FIG. 1 mounted on a propelling vehicle;

FIG. 3 is an enlarged fragmentary sectional view illustrating the operation of the forward rotary elements with respect to one another in the prior art commercial mechanism corresponding to the patent;

FIG. 4 is a fragmentary plan view of the two structures shown in FIG. 3 illustrating a portion of two elongated members with their cutting edges disposed in cutting relation to a tobacco stalk;

FIG. 5 is a fragmentary sectional view taken along the line 5—5 of FIG. 4;

FIG. 6 is a fragmentary sectional view taken along line 6—6 of FIG. 4; and

Figures 3, 4, 5, 6:
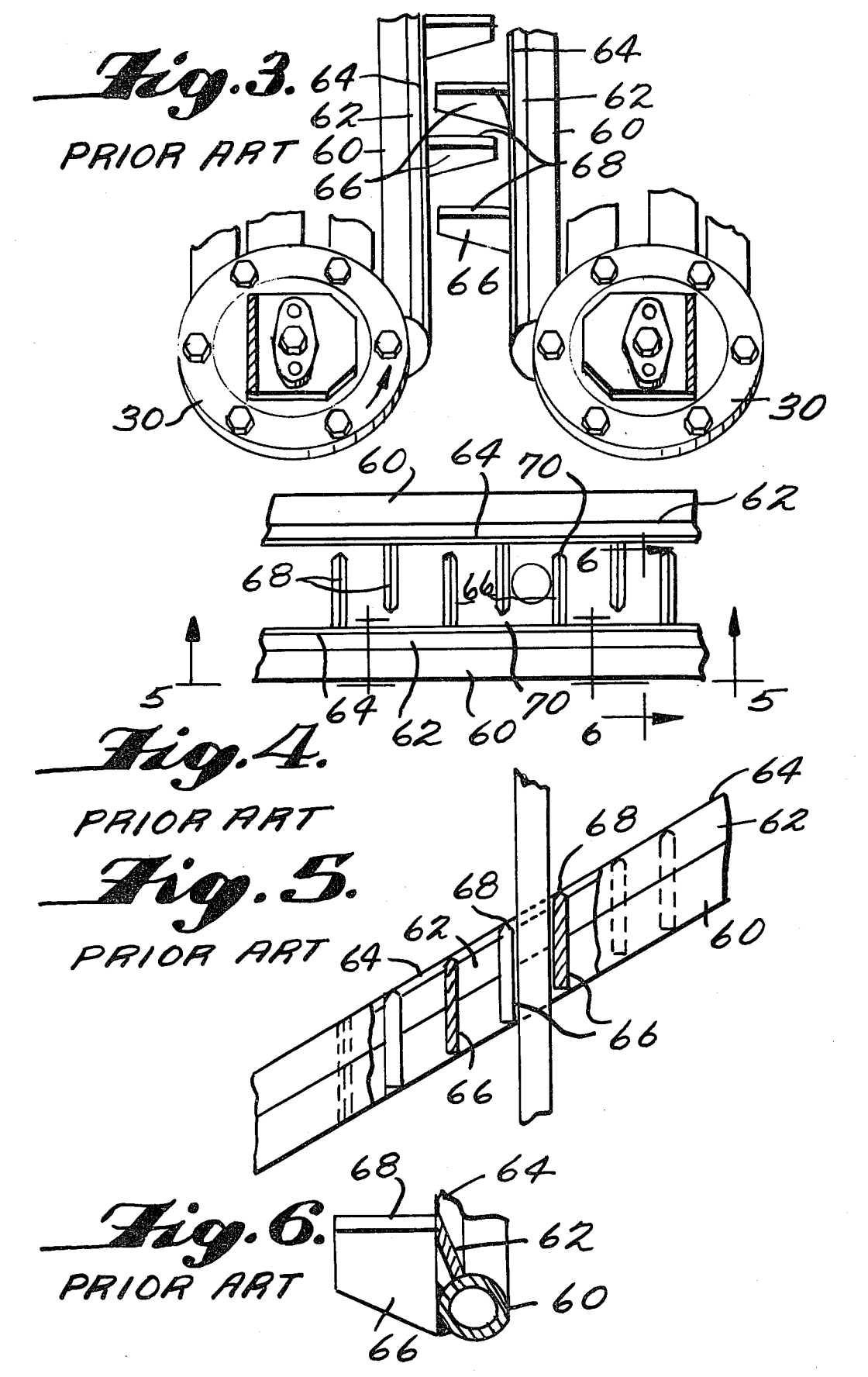
Figure 7:
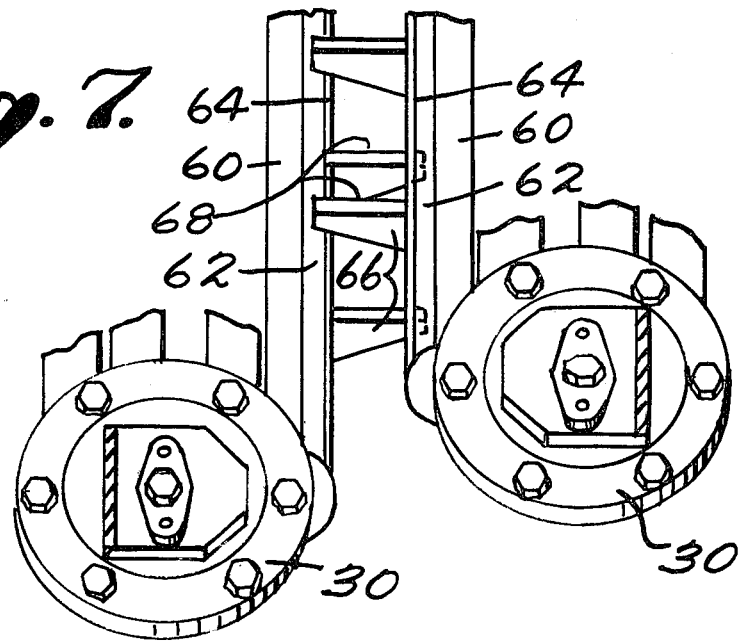
Figure 8:
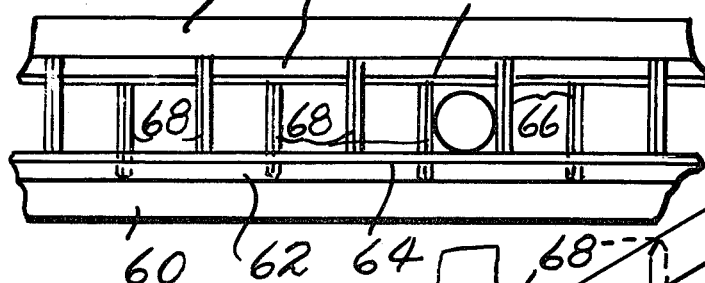
Figure 9:
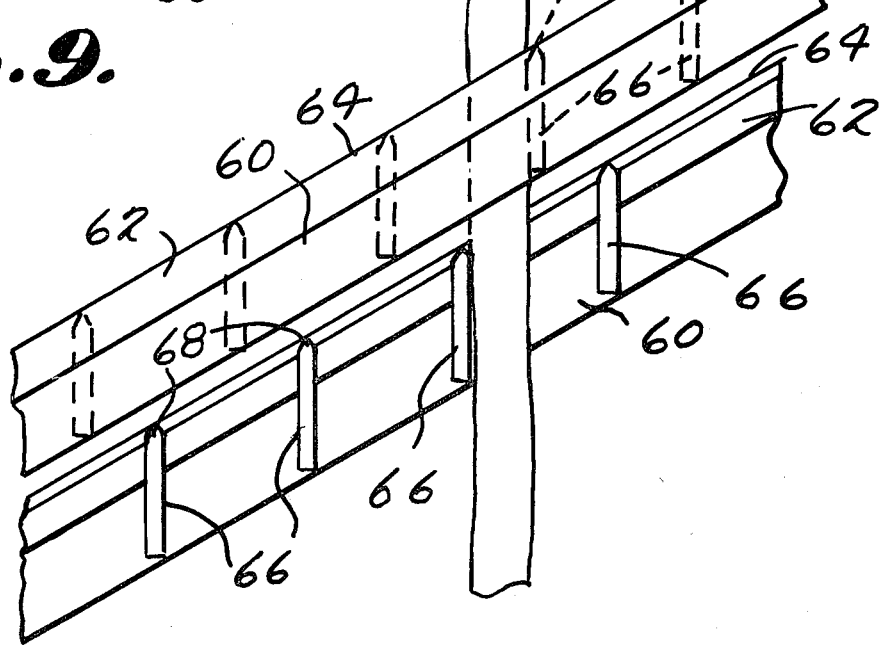

FIGS. 7, 8, and 9 are views corresponding to the views of FIGS. 3, 4 and 5, respectively, illustrating a preferred embodiment of the improvement embodying the principles of the present invention.

Referring now more particularly to the drawings, there is shown therein a tobacco priming device 8 constructed in accordance with the principles of U.S. Pat. No. 3,093,949. The improvements of the present invention can best be understood by first obtaining an understanding of the patented structure in which the improvements are made. The patented priming device is adapted to be moved through a tobacco field by means of a suitable vehicle generally indicated at 10 and fragmentarily shown in FIG. 2. The priming device may be mounted upon a propelling vehicle 10 such as that disclosed in Wilson U.S. Pat. Nos. 2,816,411, 3,083,517, 3,772,862 or 4,178,745. Alternatively, the priming device may be adapted to be drawn through a tobacco field by means of a tractor or other such vehicle. Any suitable means may be utilized to mount the device on the vehicle, the preferred arrangement employing a frame means, such as indicated at 18, which will provide for vertical adjustment. Such a structure is shown in FIG. 2. In this manner, a swath of tobacco leaves may be removed from various levels on the tobacco stalk, the lowest leaves being removed first and the higher leaves being removed as they ripen.

The tobacco priming device 8 of the patent comprises, in general, a pair of parallel defoliating units 12 and 14. As shown, these units are arranged to impart a combined action upon the tobacco leaves as the device is moved along the row of plants. These units are arranged to sever the leaves from the stalks in an upward cutting motion at a point adjacent their connection with the stalks, the knives or cutting elements being arranged to cut the leaves extending from the plant both parallel to the rows and perpendicular to the row of stalks. The motion of the defoliating units 12 and 14 is such as to carry the cut leaves over the unit, depositing them on suitable conveyors 38 which carry them to a central collecting station or bin (not shown).

Since the defoliating units 12 and 14 are identical except that they are arranged to operate in complementary fashion, a description of one will suffice in order to present a complete understanding of both units. Each of the defoliating units 12 and 14 are located on the frame means 18 (see FIG. 2) and held in place by means of brackets 20 and 22 on said platform. The position of the defoliating unit 12 on the frame means 18 is adjustable so as to allow removal of leaves at various heights of a tobacco stalk. As best shown in FIGS. 1 and 2, the rearward bracket 22 is located some distance behind and above the forward bracket 20. Extending upwardly and rearwardly between the brackets 20 and 22 is a stationary U-shaped shaft 24. The free end of the lower leg of the shaft 24 is bent in a direction extending slightly upwardly and forwardly, as indicated at 25, and is fixedly secured to the bracket 20, as by a clamp 23. The free end of the rearward leg of the U-shaped shaft is bent in a direction extending slightly downwardly and rearwardly, as indicated at 27, and is fixedly attached to the bracket 22. Rotatably mounted on the bent ends 25 and 27 of the shaft 24 is a pair of elements in the form of circular plate members 30 and 32, respectively. It will be noted that the circular plate members are rotatable about parallel generally vertically oriented spaced axes which extend slightly downwardly and rearwardly.

A plurality of members in the form of elongated rods 34 are connected to the members 30 and 32 at equally-spaced intervals about the periphery thereof by stub shaft elements 42 and 44. Elements 42 and 44 are mounted in members 30 and 32 so as to rotate freely about an axis generally parallel to the axis of said members 30 and 32. Each stub shaft element 42 and 44 is adapted to receive an adjacent transverse bent end of the associated elongated rod 34 within an opening which is generally perpendicular to the axis about which elements 42 and 44 rotate, and the bent ends of the rods 34 are free to oscillate within this opening. It is to be noted that since the axis of members 30 and 32 lie in different planes, rods 34 will maintain their orientation throughout their circular travel as members 30 and 32 are rotated.

The elongated rods 34 have a plurality of shorter rod members 46 extending outwardly therefrom and perpendicularly thereto at intervals equally spaced along their length. The rod members 46 all lie in a generally horizontal plane. Suitably fixed along the upper side of each of the elongated rods 34, as by welding or other suitable means, is a vertically disposed knife or cutting element 16 having a sharp upper cutting edge. Extending perpendicularly outwardly from each of the knife elements 16 and attached, also by welding or other suitable means, to the upper sides of the shorter rod members 46 are similar knives or cutting elements 48. It is to be noted that the bent portion of the U-shaped shaft 24 is offset so as not to interfere with the movement of the rod member 46 and associated knives 48.

A spur gear 52 is suitably fixed to the rotary member 30 of each defoliating unit and is maintained in axially spaced relation therefrom by means of a plurality of spacer elements 50 positioned at spaced intervals about the periphery thereof. Each spur gear 52 meshes with a cooperating gear 54 rotatably mounted at right angles thereto which receives motive power through a shaft 56. A gasoline engine or other suitable power means (not shown) for driving each shaft 56 is located on the propelling vehicle.

Secured to each bracket member 20 at the forward end thereof is a generally cone-shaped guide means 58 for guiding the tobacco plant into the defoliating mechanism as shown in FIG. 1.

The patented device is moved along a row of tobacco plants by a suitable propelling unit in the manner described in the aforesaid patents to Wilson, with defoliating units 12 and 14 disposed on opposite sides of the row of tobacco plants in upwardly and forwardly inclined relation thereto. Guide means 58 attached to the brackets 20 at the forward end of the defoliating units 12 and 14 direct the stalks between the two driven units. Preferably, the units are disposed at an inclination of approximately 20° to the horizontal so that the lower end of the units will initially engage the lowermost portion of the swath to be removed, with removal proceeding from bottom to top. The leaves of tobacco plants ripen from botton to top so that it is necessary to remove the lower leaves first; the upper leaves are subsequently removed as they ripen. Accordingly, it is preferable that the device be carried for vertical adjustment by the propelling vehicle so that progressively higher swaths of leaves may be removed from the stalks as the leaves ripen.

In operation, the shafts 56, which receives power from a gasoline engine or other suitable power means located on the propelling vehicle, drive gears 54, which in turn drive gears 52. The spur gears 52 which are connected to the respective members 30 transmit rotational motion to the respective defoliating units 12 and 14.

The elongated rods 34 of each unit are thereby caused to revolve about an imaginary axis. As viewed from the forward end, the defoliating unit 12 rotates in a counterclockwise direction while defoliating unit 14 rotates in a clockwise direction. The rod member 46 on defoliating unit 12 with its attached cutting elements 48 intermeshes with like elements on defoliating unit 14, each set of rod members and cutting elements moving in an upward direction along the line at which they intermesh.

The motion of each of the associated rod members 34 and 46 is such that the cutting elements 16 and 48 attached thereto move into engagement with the tobacco leaves with a substantially translational movement. At the same time that the rod members 34 and 46 engage the stalks, the knives move in an upward cutting action severing the leaves from the stalks at the base portion thereof. The leaves which extend from the stalks in a direction generally parallel to the rows of plants are severed by cutting elements 48, and the leaves which extend from the stalks in a direction generally perpendicular to the rows of plants are severed by cutting elements 16. After the leaves are cut from the stalk, they are carried up over the defoliating units and disposed on to the conveyor belts disposed therebelow which carry them to a central collecting station.

FIGS. 3-6 illustrate in detail a recent commercial embodiment of the patented structure. In this commercial embodiment the elongated members are formed from tubes 60 which are straight. The forward end of of each tube is arranged to provide the appropriate pivotal connection with the associated rotary element 30. The rearward end of each tube 60 is similarly configured to provide the required pivotal connection with the associated rotary element 32. Mounted on the upper portion of each tube 60 is an elongated straight cutting blade 62. As shown, each cutting blade is suitably welded to the upper surface of the associated tube 60 along its lower edge and extends upwardly therefrom at a slight angle. A sharp cutting edge 64 is formed along the upper edge of the cutting blade 62 by a single beveled cut. Spaced along the longitudinal extent of each of tube and blade 60-62 is a plurality of transversely extending blades 66. These blades are welded along one side surface to the associated tube 60 and blade 62. Each blade 66 includes an upper cutting edge 68 formed by beveled surfaces.

As best shown in FIG. 3, it will be noted that the relative position of the forward rotary elements 30 and the circumferential connection of the elongated members therewith is such that during operation successive elongated members of the units will move into innermost positions with respect to one another during which the cutting action takes place. FIGS. 4 and 5 illustrate the position of two cooperating elongated members of the two units when in such innermost positions in relation to a tobacco stalk and it will be noted that one of the transverse cutting blades 66 of one of the units is disposed forwardly of the stalk with respect to the direction of movement while an intermeshing transverse blade 66 of the other unit is disposed rearwardly of the stalk. Since both of the elongated members are moved into their innermost positions together as shown in FIG. 5, the longitudinal cutting edges 64 of the units must be spaced outwardly on opposite sides of the stalk so as to permit the free ends of the associated intermeshing transverse cutting blades 66 to have sufficient clearance. There is thus provided two corner gaps indicated by the numeral 70 in FIG. 4.

It will be understood that in addition to the upward cutting movement of the cutting edges 64 and 68 of the elongated members, the cutting edges also have a rearward component of movement which is determined by the angle of inclination of the axis of rotation of the rotary elements 30 and 32. Preferably, the forward travel of the vehicle is coordinated with the rotational speed of the defoliating units such that the cutting edges 68 move translationally upwardly with respect to the tobacco stalk. Moreover, in accordance with conventional practice, the relative position of the transverse cutting blades 66 in successive adjacent elongated members of each unit is coordinated so that the effect will be a continuous engagement of the tobacco stalk by virtue of the transfer of the engagement as one set of intermeshing transverse cutting blades moves upwardly out of the innermost position and the next set of intermeshing transverse blades moves forwardly into meshed cutting relation.

A typical commercial arrangement is to alternate the position of the transverse cutting elements 66 on alternate elongated members, that is to say that if the No. 1 elongated member is provided with a spacing of transverse blades 66 such as shown in the upper portion of FIG. 4, the next or No. 2 elongated member will provide transverse cutting blades 66 which are positioned in the transverse positions occupied by the transverse cutting blades 66 of the lower elongated element shown in FIG. 4. Similarly, the consecutive elements in the other unit shown in the lower portion of FIG. 4 will vary so that each cooperating pair intermesh. It will be understood that other arrangements may be provided as, for example, the spacing could be, instead of half the spacing with every other elongated element, one-third of the spacing for every three elements, and so forth.

With the above in mind, the improvements of the present invention have the effect of moving successive intermeshing elongated members into cutting relation with the stalk in such a way that the gaps 70 provided in the prior art arrangement are eliminated. This also allows adjacent elongated members to be adjusted closer to the stalk as needed to conform with tobaccos of different stalk diameter characteristics. In the preferred embodiment of the present invention the closing of the gaps is achieved by the displacement of one of the defoliating units vertically with respect to the other. This change is illustrated in FIG. 7 which is a view comparable to FIG. 3. It will be noted that because of the vertical displacement of one of the units with respect to the other, it becomes possible to move the two units closer together because clearance is now provided between the free ends of the transverse cutting blades 66 and the longitudinal cutting blade 62 of the other unit by virtue of the aforesaid vertical displacement provided between the two units.

FIGS. 8 and 9 illustrate the cutting action of the improvements of the present invention on a tobacco stalk as compared with the prior art arrangement shown in FIGS. 4 and 5. It will be noted that when the elongated members of opposite units are moved into their innermost position the longitudinal cutting edge 64 of each successive elongated member passes into a vertical plane which is closely adjacent the associated side of the stalk. The transverse distance between the vertical planes on opposite sides of the stalk is less than the transverse extent of the transverse cutting blades 66 so that the free ends of the transverse cutting blades of each of the elongated members extend beyond the vertical plane through which the longitudinal cutting edge of the opposite unit passes. Thus, as is clearly shown in FIG. 8, the entire periphery of the tobacco stalk is surrounded when the cutting edges are in cutting relation thereto without any gaps. Moreover, this peripheral encirclement is closer to the periphery of the stalk than is the case with the prior art arrangement. Consequently, the cutting action achieved by virtue of these changes is one which promotes a full cut irrespective of the position of the stem of the leaf on the stalk and hence there is less shredding and less leaf or stem portions remaining attached to the stalk.

The preferred embodiment as shown in FIGS. 7, 8 and 9 wherein the removal of the gaps is provided by moving the two units vertically with respect to one another and then inwardly with respect to one another is preferred since the arrangement can be accomplished without the necessity of changing the position of the transverse members 66 on the associated tubes 60. It will be understood, however, that it is within the contemplation of the present invention to accomplish overlap and hence elimination of the gaps by other changes in orientation. For example, it would be possible to achieve overlap by displacing the two units horizontally, in which case it would become necessary to adjust the position of the transverse cutting blades to accommodate the amount of horizontal displacement provided. Similarly, it would be possible to achieve overlap by displacing the two units angularly with respect to one another.

With this latter arrangement as well as with the horizontal displacement arrangement, it is, of course, necessary to also achieve a relative movement of the two units toward one another to effect the overlap. In essence, the first movement permits overlap to take place while the second movement actually effects the overlap. Here again, when utilizing relative angular displacement between the two units accommodation of the position of the transverse cutting elements would be appropriate. It will also be understood that the overlap and elimination of the gaps can be achieved by combination of any of the above three initial movements coupled with the final movement of the two units closer together.

In the prior art arrangement heretofore described, the mounting of the two cooperating defoliating units included the capability of adjusting the horizontal spacing between the units. However, this capability was used as a means for accommodating manufacturing tolerances by the manufacturer so as to insure a proper fixed setting prior to sale. No field adjustment by the farmer was contemplated. With the present invention, however, field adjustment by the farmer becomes meaningful in that, within the overlap range provided, there is room to adjust for tobacco stalk size. Here again this ability to adjust the horizontal spacing to accommodate the relatively smaller stalk sizes at the top of the plant during the last primings insures an improved cutting action in those situations where experience has indicated that the need for an improved cutting action is greatest.

It thus will be seen that the objects of this invention have been fully and effectively accomplished. It will be realized, however, that the foregoing preferred specific embodiment has been shown and described for the purpose of illustrating the functional and structural principles of this invention and is subject to change without departure from such principles. Therefore, this invention includes all modifications encompassed within the spirit and scope of the following claims.

What is claimed is:

1. In an apparatus for priming tobacco plants having stalks and leaves extending outwardly therefrom comprising a vehicle frame movable along a row of tobacco plants, a pair of intermeshing defoliating units, means mounting said units on said frame in spaced side-by-side relation for vertical adjustment together with respect to said frame, each of said defoliating units including a forward rotary element mounted on said frame for rotation about a first axis, a rearward rotary element mounted on said frame in a position spaced rearwardly and upwardly with respect to said forward rotary element for rotation about a second axis parallel to said first axis, a plurality of elongated members extending between said rotary elements, means mounting the forward ends of said elongated members on said forward rotary element for rotational movement about axes parallel to said first axis and spaced circumferentially thereabout, means mounting the rearward ends of said elongated members on said rearward rotary element for rotational movement about axes parallel with said second axis and spaced circumferentially thereabout, each of said elongated members including cutting blade means thereon having sharp upper cutting edges extending generally in directions both longitudinal and transverse with respect to the row of plants, the transverse extent of the cutting edges of each unit being in a direction toward the other and in longitudinally intermeshing relation therewith, and driven means operatively connected with at least one rotary element of each unit for rotating said element and effecting an orbital translational movement of the elongated members of each unit in a direction such that the cutting edges of each elongated member will be moved inwardly toward the stalks, upwardly to sever the leaves from the stalks and then outwardly to carry the severed leaves away from the stalks, the improvement which comprises the longitudinal extent of the cutting edges associated with the elongated members of each unit during their movement inwardly toward the stalks passing into a common vertical plane disposed closely adjacent the associated side of the stalks of a row of tobacco plants along which the vehicle frame is moved so as to insure that leaves attached to stalks at positions adjacent opposite sides thereof with respect to the row will be severed, the distance between the aforesaid vertical planes associated with both units being less than the transverse extent of the cutting edges of said units so that the free ends of the transverse extent of the cutting edges of each elongated member associated with each unit during their movement inwardly toward the stalk moves inwardly a distance beyond the vertical plane associated with the other unit so as to insure that leaves attached to stalks at positions other than at opposite sides thereof with respect to the row will be severed.

2. The improvement as defined in claim 1 wherein said cutting blade means associated with each elongated member includes a straight longitudinal cutting blade having an upper straight cutting edge and a plurality of transverse cutting blades extending transversely inwardly from said longitudinal cutting blade at longitudinally spaced positions therealong.

3. The improvement as defined in claim 2 wherein the straight upper cutting edges of one unit pass into the common vertical plane associated therewith at a position spaced vertically with respect to the position at which the straight upper cutting edges of the other unit pass into the common vertical plane associated therewith.

4. The improvement as defined in claim 3 wherein successive straight upper cutting edges of both units pass into the common vertical planes associated therewith at the same time.

* * * * *